Feb. 21, 1928.

D. RAWSTRON 1,659,746

SPRING MOUNTING FOR VEHICLES

Filed Nov. 1, 1926    2 Sheets-Sheet 1

Inventor
Donald Rawstron,
By B. P. F. Welburn
Attorney

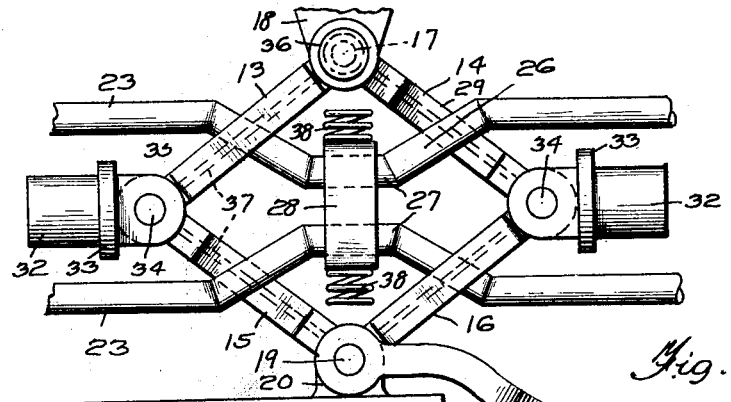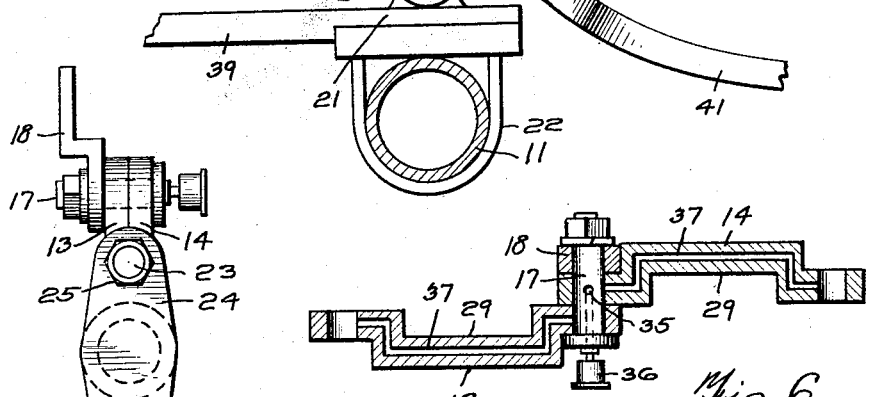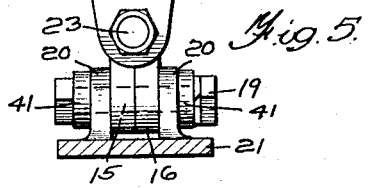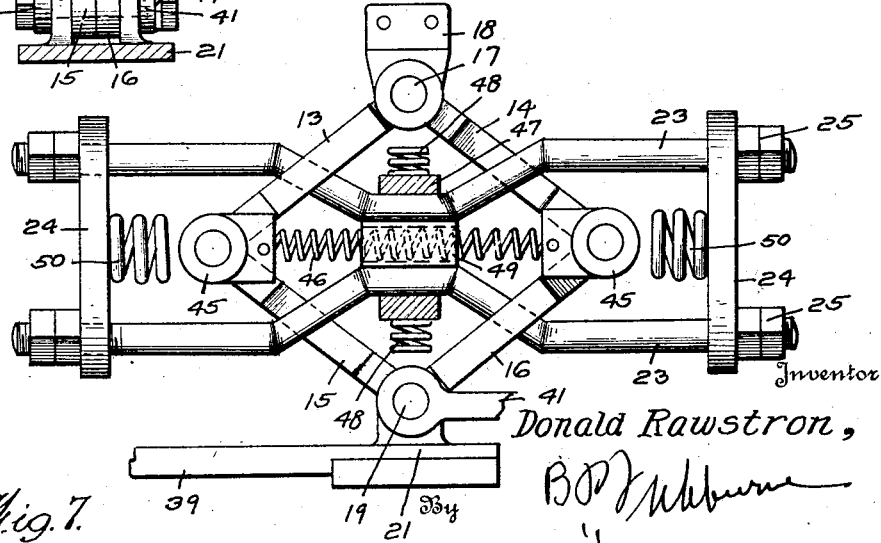

Patented Feb. 21, 1928.

1,659,746

UNITED STATES PATENT OFFICE.

DONALD RAWSTRON, OF BLACK MOUNTAIN, NORTH CAROLINA, ASSIGNOR OF ONE-HALF TO COIT DUWANE FAXON, OF CHICAGO, ILLINOIS.

SPRING MOUNTING FOR VEHICLES.

Application filed November 1, 1926. Serial No. 145,518.

My invention relates to spring mountings for vehicles, such as automobiles or the like.

An important object of the invention is to provide a spring mounting which will produce a substantially constant supporting force upon the chassis of the automobile, thereby eliminating undue vertical movements of the chassis.

A further object of the invention is to provide a spring mounting of the above mentioned character, which is simple in construction, strong and durable.

Other objects and advantages of the invention will be apparent during the course of the following description.

Figure 1:
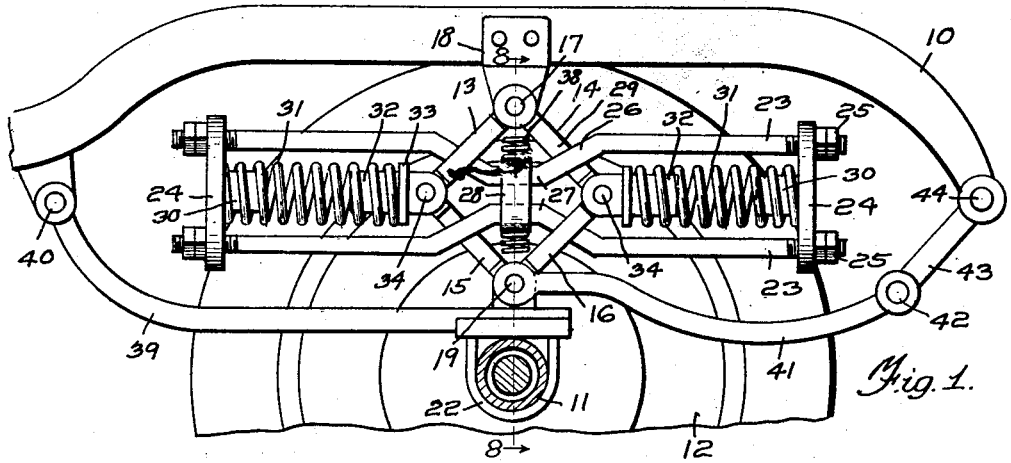
Figure 2:
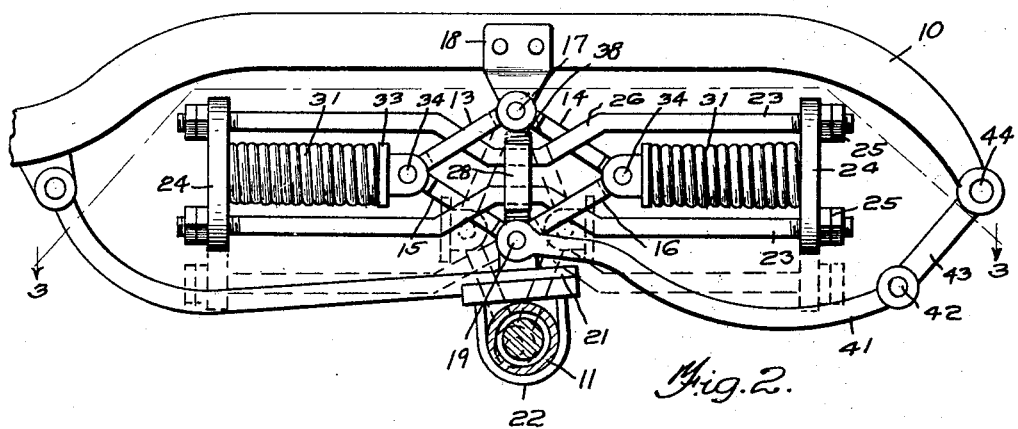
Figure 3:
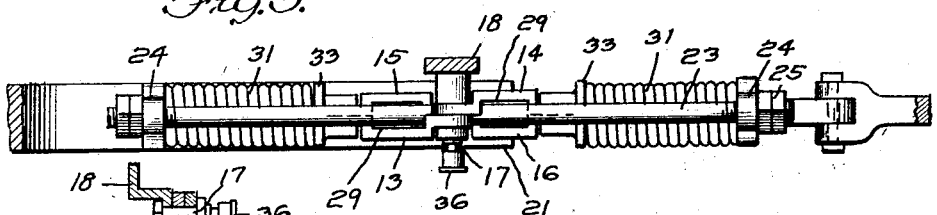
Figure 8:
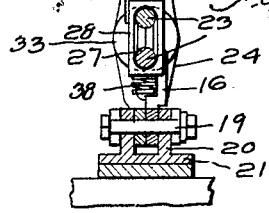

In the accompanying drawings forming a part of this specification and in which like numerals are employed to designate like parts throughout the same, Figure 1 is a side elevation of a spring mounting embodying my invention, showing the axle in a relative normal position, Figure 2 is a similar view showing the axle elevated with respect to the chassis, Figure 3 is a horizontal section taken on line 3—3 of Figure 2, Figure 4 is an enlarged side elevation of the toggle-joint included in the device, parts omitted, Figure 5 is an end elevation of the device, Figure 6 is a longitudinal section through two of the links of the toggle-joint, showing the lubricating means, Figure 7 is a side elevation of a modified form of the spring mounting embodying the invention, and, Figure 8 is a transverse section taken on line 8—8 of Figure 1.

In the drawings, wherein for the purpose of illustration are shown preferred embodiments of my invention, the numeral 10 designates a chassis beam of an automobile or the like, the forward end of which is preferably in the form of a bow, curved downwardly, as shown. Arranged beneath the chassis beam is the axle 11 carrying wheels 12.

The spring mounting embodies a toggle-joint structure, comprising a pair of upwardly converging links 13 and 14 and a pair of downwardly converging links 15 and 16. The links 13 and 14 are pivotally connected at their upper ends by means of a bolt 17, also connected with a bracket 18, rigidly attached to the beam 10 and depending therefrom, as shown. The links 15 and 16 are pivotally connected at their lower ends by a bolt 19, passing through ears 20, formed upon a plate 21, Figure 5. This plate is mounted upon the axle 11 and clamped thereto by U-bolts 22 or the like.

A spring carrying frame is provided, embodying a pair of rods 23, the ends of which pass through cross heads 24, apertured to receive them, and these cross heads are adapted to be longitudinally adjusted upon the rods 23. These ends of the rods 23 receive nuts 25, as shown. The intermediate portions of the rods 23 are bent into generally V-shaped portions, including inwardly converging sections 26 and parallel portions 27. The parallel portions are surrounded by a link 28, as shown. The links 13 and 14 of the toggle-joint have lateral offset intermediate portions, forming sockets 29, for receiving the diagonal portions 26 of the rods 23, and the lower links 16 have similar offset portions providing similar pockets. The link 13 is positioned upon the opposite side of the rod 23 with respect to the link 14 and the link 15 is placed upon the opposite side of the lower rod 23 with respect to the link 16, while the links in the upper set are arranged upon the opposite sides of the rods 23 with respect to the links in the lower set.

The cross heads 24 are provided with studs or trunnions 30, rigidly attached thereto, and receiving the outer ends of compressible coil springs 31. The inner ends of these compressible coil springs receive couplings or plungers 32, provided with flanges or shoulders 33. These couplings are pivotally connected with the adjacent ends of the links 13, 15; 14, 16; by means of bolts 34 or the like.

It might be stated at this point, that either or all of the bolts 17, 19 and 34 may be provided with a lubricant supply port 35, extending radially through the side thereof and leading to the outer end of the bolt and receiving a lubricant, such as grease, from a grease cup 36. The links 13, 14, 15 and 16 may be provided with longitudinal ports 37, Figure 6, for receiving the lubricant from about the bolts, as is obvious.

The link 28 has compressible coil springs 38 attached to the ends thereof, which are adapted to engage with the ends of the links of the toggle-joint, at its top and bottom, when the same is collapsed horizontally beyond a certain limit.

The numeral 39 designates a rear radius rod which is pivoted to the chassis beam 10 at 40, and this radius rod extends forwardly and is preferably formed integral with the plate 21, and is accordingly clamped to the axle 17. The bolt 19 has pivotal connection with a forward radius rod 41, extending forwardly for pivotal connection at 42 with a link 43, which is pivoted to the forward end of the beam 10, as shown at 44.

The operation of this form of the apparatus will be as follows:

The springs working in conjunction with the toggle joint, in my arrangement of elements, produce a substantially constant supporting force for the chassis beam 10. When the wheel runs upon an elevation in the roadway, the beam 10 remains at substantially the same elevation while the axle 17 is elevated with relation thereto, Figure 2. The toggle-joint is horizontally elongated, and the springs 31 compressed. In the event that the upward movement of the axle 17 should be excessive, the movement of the toggle-joint is limited by means of the springs 31 becoming completely closed. Prior to this action, the movement of the toggle-joint is opposed by its upper and lower ends engaging the springs 38. When the axle moves downwardly with relation to the beam 10, the toggle-joint has its horizontal dimension decreased and the springs 31, of course, expand. It is thus seen that the device will convert the constantly varying force of the ordinary leaf-spring, employed upon an automobile into a substantially constant supporting force for the chassis, regardless of the relative vertical movements of the axle, within limits.

In Figure 7, I have shown a modified form of the invention. In this form of the invention, couplings 45 are pivotally connected, with the outer ends of the links 13, 14, 15 and 16, and the inner ends of these couplings have connections with a retractile coil spring 46. A link or loop 47 surrounds the inner portions 27 of the rods 23 and carry compressible coil springs 48, arranged to engage the top and bottom of the toggle joint. The link 47 carries a guide sleeve 49 through which the spring 46 extends, as shown. Attached to the cross heads 24 are compressible coil springs 50, arranged in the path of travel of the outer ends of the couplings 45. All other parts of the device remain identical to those described in the first form of the invention.

The operation of the second form of the invention is, of course, similar to that of the first form. When the axle moves upwardly, with relation to the chassis, the toggle-joint is extended horizontally, and the spring 46 is stretched. When the toggle-joint approaches the end of its outward travel, the couplings 45 engage the springs 50, and the springs 48 engage the top and bottom of the toggle-joint, and serve as an additional yielding force to oppose the further outward movement of the toggle-joint. Excessive outward movement of the toggle-joint will completely close the turns of the springs 50, which will then serve as a positive abutment for the toggle-joint, to limit further outward movement.

It is to be understood that the forms of my invention, herewith shown and described are to be taken as preferred examples of the same, and that various changes in the shape, size and arrangement of parts may be resorted to without departing from the spirit of my invention, or the scope of the subjoined claims.

Having thus described my invention, what I claim is:

1. In a vehicle spring mouting, a toggle-joint adapted to have its top connected with the chassis of the vehicle and its bottom connected with the axle, a pair of generally horizontal rods arranged near the toggle-joint, the links of the toggle-joint being arranged upon opposite sides of the rods, cross heads carried by the outer ends of the rods, springs secured to the cross heads, and couplings pivoted to the sides of the toggle-joint and attached to the springs, the springs serving to support the rods from the toggle-joint.

2. In a vehicle spring mounting, a toggle-joint adapted to have its top connected with the chassis of the vehicle and its bottom connected with the axle, a pair of generally horizontal rods arranged near the toggle-joint and extending outwardly beyond the opposite sides thereof, springs connected with the ends of the rods and with the sides of the toggle-joint, said springs serving to support the rods from the toggle-joint, and springs connected with the intermediate portions of the rods and adapted to engage the tops and bottoms of the toggle-joint.

3. In a vehicle spring mounting, a toggle-joint adapted to have its top pivotally connected with the chassis of the vehicle and its bottom connected with the axle, a pair of generally horizontal rods arranged near the toggle-joint and extending outwardly beyond the opposite sides thereof, springs connected with the outer portions of the rods and adapted to oppose the outward horizontal movement of the toggle-joint, and springs connected with the intermediate portions of the rods and adapted to oppose the inward vertical movement of the tops and bottoms of the toggle-joint.

4. In a vehicle spring mounting, a toggle-joint adapted to have its top pivotally connected with the chassis of the vehicle and its bottom pivotally connected with the axle, a pair of generally horizontal rods arranged near the toggle-joint, the links of the toggle-joint being arranged on opposite sides of the rods, and spring means to oppose the outward horizontal spreading movement of the toggle-joint, said spring means being connected with the rods for supporting the same.

5. In a vehicle spring mounting, a toggle-joint adapted to have its upper end pivotally connected with the chassis of the vehicle and its lower end pivotally connected with the axle, a pair of generally horizontal rods arranged near the toggle-joint, transverse elements connecting the ends of the rods, springs secured to the transverse elements and arranged near the side ends of the toggle-joint for co-action therewith, a member connecting the intermediate portions of said rods and arranged within the toggle-joint, and springs secured to the member and disposed in the path of travel of the upper and lower ends of said toggle-joint.

In testimony whereof I affix my signature.

DONALD RAWSTRON.